United States Patent [19]

Messina et al.

[11] 4,017,584

[45] Apr. 12, 1977

[54] PROCESS FOR THE RECOVERY OF ALUMINUM TRICHLORIDE

[75] Inventors: Giuseppe Messina, Alghero (Sassari), Italy; George Andrew Olah, Shaker Heights, Ohio; Riccardo Moraglia, Sassari, Italy

[73] Assignee: Societa Italiana Resine S.I.R.. S.p.A., Milan, Italy

[22] Filed: May 6, 1975

[21] Appl. No.: 574,953

[52] U.S. Cl. .............................. 423/122; 423/495; 423/650

[51] Int. Cl.² ...................... C01F 7/56; C01B 1/02; C01B 1/16

[58] Field of Search ........... 423/122, 126, 495, 650

[56] References Cited

UNITED STATES PATENTS

| | | | |
|---|---|---|---|
| 1,277,329 | 8/1918 | McAfee | 423/495 UX |
| 1,477,058 | 12/1923 | Houlehan | 423/495 UX |
| 2,486,485 | 11/1949 | Latchum | 423/122 |
| 2,517,692 | 8/1950 | Mavity | 423/126 X |
| 2,525,830 | 10/1950 | Sailors et al. | 423/122 |
| 2,526,564 | 10/1950 | Hepp et al. | 423/650 X |
| 3,026,176 | 3/1962 | Tyson et al. | 423/495 X |
| 3,295,922 | 1/1967 | Walker | 423/495 |

*Primary Examiner*—Edward Stern
*Attorney, Agent, or Firm*—McNenny, Pearne, Gordon, Gail, Dickinson & Schiller

[57] ABSTRACT

Aluminum trichloride is separated and recovered from its complexes with hydrocarbons and hydrogen chloride by contacting the complexes with metallic aluminum at 20°–100° C and recovering the resulting precipitate of aluminum trichloride.

8 Claims, No Drawings

PROCESS FOR THE RECOVERY OF ALUMINUM TRICHLORIDE

The present invention relates to the separation and recovery of aluminium trichloride from its complexes with hydrocarbons and hydrogen chloride.

In particular, the invention relates to a treatment for separating, at least partly, the aluminium trichloride contained in these complexes, and recovering the said separated aluminium trichloride.

It is known that a number of conversion reactions of hydrocarbons, for instance those of isomerization and alkylation, are catalyzed, in industrial practice, by means of aluminium trichloride in the form of a complex with hydrocarbons in which said aluminium trichloride is present in a proportion exceeding about 2o% by weight.

Such complexes are generally fluids under the ambient conditions, and because of their sufficient fluidity they are considered in practice as liquids.

These fluid complexes which, as is known, consist of hydrogen chloride besides hydrocarbons and aluminium trichloride, undergo progressive disactivation, in use.

This is due to the fact that during reaction, heavy byproducts are formed (for example, polyalkylates, aromatic hydrocarbon polycondensates and polymers) which cause the formation of very stable complexes which are therefore of very low activity.

Moreover, the catalyst becomes poisoned by a number of impurities such as water, carbon monoxide and sulphurous products, introduced into the reaction medium for example together with the reagents.

Consequently, if one wishes to keep the catalytic complex at the required level of activity, it is necessary to add fresh aluminium trichloride after removing a fraction of the spent complex, in order to prevent accumulation of the latter in the reaction medium.

If one considers a continuous alkylation process, one proceeds in practice in the following manner. The catalytic complex which is spent or of diminished catalytic activity is separated from the alkylation product. To a part of the spent complex fresh aluminium trichloride is added and the activated complex obtained in this way is recycled to the alkylation medium.

The remaining fraction of the spent complex is removed from the system, and, generally, destroyed with water or alkaline aqueous solutions.

In this manner, the aluminium trichloride present in the discharged spent complex is transformed into aluminium hydrate or aluminates, and cannot therefore be re-used as a catalyst.

Consequently, besides the economic disadvantage, there is also the problem of pollution related to the discharge of the aqueous solution containing, in addition to aluminium compounds, substances of an organic nature.

There has therefore arisen the problem of separating the aluminium trichloride from those catalytic complexes which are spent or of diminished activity and which are removed from the medium in which the conversion reaction of the hydrocarbons takes place.

The aluminium trichloride represents, in fact, a valuable product, and an efficient and economic method for its recovery can influence the cost effectiveness of the process in which this catalyst is used.

In this technical field, there are a number of known processes for the recovery of aluminium trichloride from its complexes with hydrocarbons.

The said processes are essentially based on the destructive distillation of the said complexes. More precisely, the aluminium trichloride-hydrocarbons complexes are fed in a medium maintained at a high temperature so as to cause their vaporisation, and the aluminium trichloride is condensed and separated from the other vaporized products.

This type of procedure presents various disadvantages due chiefly to the extreme corrosiveness of the material treated in the conditions prevailing in destructive distillation and also because of the presence of the hydrogen halide in the complexes subjected to treatment. Moreover, the formation of solid distillation residues can cause clogging and obstructions in the apparatus used. Finally, methods based on destructive distillation allow a recovery of aluminium trichloride which does not exceed 60 to 70% of the aluminium trichloride present in the complex subjected to treatment.

According to another known process, the catalytic complexes which are spent or of diminished activity are subjected to an instantaneous vaporizing treatment, and the vapors are condensed, causing in this way the separation of a liquid complex of high catalytic activity.

This method of proceeding, though avoiding many disadvantages of the previously described procedures, is not entirely satisfactory, mainly because of the formation of solid residue as bottom products of the instantaneous distillation.

Now, a simple and economically convenient method has been found which makes it possible to recover the aluminium trichloride from the said complexes containing hydrocarbons, with high yields and avoiding the disadvantages of the process of the prior art.

Thus, the invention provides a process for separating and recovering aluminium trichloride from a complex of aluminium trichloride, hydrocarbons and hydrogen chloride, characterized by contacting said complex with particulate metallic aluminium at a temperature of from ambient temperature to 100° C, thus causing the formation of a precipitate of aluminium trichloride, and recovering the precipitated aluminium trichloride.

By means of the addition of metallic aluminium, one causes the separation of the solid aluminium trichloride from the said complex and the said separate aluminium trichloride can easily be recovered with the usual techniques for separating solids from liquids, such as, for example, filtration or centrifugation.

The aluminium trichloride - hydrocarbons complexes possess a structure which has not yet been fully defined. However, these complexes include aluminium trichloride, hydrocarbons and hydrogen chloride.

The latter is present in the complex insofar as it forms in the conversion reaction of the hydrocarbons (for example in the alkylation of aromatic compounds with chlorohydrocarbons) or it can be added to the reaction medium as a promoter of the said reaction. For this purpose it is possible to add hydrogen chloride as such, or in the form of a substance capable of forming it in the prevailing operating conditions.

It is probable that in every case, a complex is formed between the hydrocarbon, hydrogen chloride and the aluminium trichloride through the following equilibrium reaction:

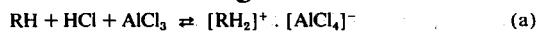

$$RH + HCl + AlCl_3 \rightleftarrows [RH_2]^+ \cdot [AlCl_4]^- \quad (a)$$

For this reason, the starting idea is to destroy the complex through the interaction of the hydrogen chloride with metallic aluminium, so as to cause the precipitation of the aluminium trichloride, also being oneself on the fact that in the absence of hydrogen chloride, no appreciable degree of complexation takes place between the aluminium trichloride and the hydrocarbon.

In this manner additional quantities of aluminium chloride are also formed as a result of the reaction of the hydrogen chloride with the added metallic aluminium.

It is probable that the general reaction which causes the separation of the aluminium trichloride from the said complex is the following:

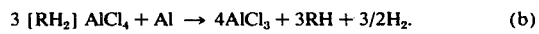

$$3 [RH_2] AlCl_4 + Al \rightarrow 4AlCl_3 + 3RH + 3/2H_2. \quad (b)$$

Therefore, according to the process of the present invention, metallic aluminium is brought into contact with the aluminium trichloride-hydrocarbon complexes.

In accordance with the invention it is possible to treat aluminium trichloride-hydrocarbon complexes of the most diverse origin, and normally, those produced by the conversion processes of hydrocarbons, such as alkylation, isomerization and polymerization processes.

Example of reactions which are catalyzed with aluminium trichloride complexes with hydrocarbons are the alkylation of benzene or of aromatic compounds generally with chlorohydrocarbons or with olefins.

The said reactions find many applications in the production of ethylbenzene and dodecylbenzenes with a branched or linear alkyl chain, the latter being valuable intermediate products for the production of detergents. Other reactions which are catalyzed with the complexes under discussion are those of the conversion of n-butane into isobutane and the production of di-isopropyl by the reaction of isobutane with ethylene.

The said catalytic complexes can have a most varied composition dependent upon their origin and generally have an aluminium trichloride content of from 20 to 50% by weight, or more.

According to the process of the present invention, the catalytic complexes described are contacted with metallic aluminium.

For this purpose one can use high purity aluminium (purity grade over 99%) or commercial aluminium of a 95% purity grade, in the form of flakes, granules or fine powder, having a granulometry of from 5 to 500 mesh. It is convenient to use fine powders insofar as one achieves faster reaction speeds.

The treatment can take place at ambient temperatures (20°– 25° C), or at temperatures higher than ambient, but not exceeding 100° C. The most suitable temperatures are within the range of from 50° to 80° C. It is not convenient, to operate at temperatures lower than ambient or exceeding 100° C.

The amount of aluminium which is added to the complex is preferably of from 0.2 to 1.0 gram-atoms for every gram-molecule of aluminium trichloride present in said complex. The most suitable values are those around 0.3 to 0.5 gram-atoms of aluminium per grams-molecule of aluminium trichloride.

If the aluminium used is in excess of the stoichiometric amount, one recovers at the end of the reaction a mixture of unaltered aluminium and aluminium chloride.

The said unaltered aluminium can be transformed into the corresponding chloride by treating the mixture with, for example, hydrogen chloride.

It is also possible to bring into contact the mixture of aluminium and aluminium chloride with hydrocarbons and hydrogen chloride to form active catalytic complexes, either in the medium in which the conversion of the hydrocarbons takes place or in a medium different from that in which the conversion of the hydrocarbons occurs.

Finally, it is possible to use the aluminium-aluminium chloride mixture to activate the spent catalytic complexes, and in this case, too, the transformation of the aluminium into its chloride can be effected by means of hydrogen chloride, either within the medium where conversion reaction of the hydrocarbons occurs or outside this medium.

In every case, higher reaction speeds are obtained if one uses a quantity of aluminium exceeding that stoichiometrically required for the reaction (b) hereabove described.

According to a preferred embodiment of the process of the invention, the metallic aluminium is pre-treated with a small amount of hydrogen chloride before being brought into contact with the spent catalytic complex.

According to a further preferred embodiment of the process of the present invention, the pre-treatment of the aluminium with hydrogen chloride takes place in the presence of the spent catalytic complex during an initial contact period.

The purpose of the pre-treatment with hydrogen chloride is to cause the aluminium to be superficially attacked, so as to make it more active in the subsequent reaction with the spent catalytic complex, and to finally allow an even higher reaction speed.

The quantity of hydrogen chloride used for the pre-treatment is not critical and is at any rate in general such that it affects substantially only the surfaces of the metallic aluminium.

The process of the present invention can be carried out in an intermittent or continuous manner, and in every case it is convenient to keep the mass agitated so as to assist a more close contact between the reagents.

Operating in the conditions described it is possible to effect in a period of time of from 0.5 to 12 hours the separation of the aluminium trichloride, present in complexed form, in quantities normally exceeding 80 and up to 100%

Moreover, additional quantities of aluminium trichloride are formed as a result of the reaction of the metallic aluminium with the hydrogen chloride present in the complex and possibly with that which is supplied for the pretreatment of the metallic aluminium.

In every case the aluminium trichloride precipitated is separated by means of usual methods such as, for instance, centrifugation or filtration. The aluminium trichloride recovered in this manner can be used as such, or can be purified, for example, by washing with solvents such as benzene, paraffins or alkyl-benzenes.

The present invention has been described in relation to the recovery of aluminium trichloride from its complexes with hydrocarbons. It is however evident that the actual invention is applicable to the recovery of all metallic halides which are complexed with hydrocarbons.

The process of the present invention is simple and economically advantageous. The reaction proceeds under extremely mild conditions and allows the separation of very high quantities of aluminium trichloride from the complexes. The disadvantages relating to previous techniques and therefore completely eliminated.

Further advantages of the process of the present invention consist in the total recovery of the organic fraction of the catalytic complex and in the avoidance of discharge problems, and this with respect to processes in which the spent complexes are treated with water or alkaline aqueous solutions.

EXAMPLE 1

100 parts by weight of a spent catalytic complex obtained from the process of alkylation of benzene with ethylene in the presence of hydrogen chloride as a promotor to give ethylbenzene, are loaded into a reactor provided with an agitator and a thermometer. The catalytic complex contains 30 parts by weight of aluminium trichloride, calculated on the basis of the content in aluminium.

One then adds to the reactor 3 parts by weight of metallic aluminium of a purity grade over 99%, in the form of extremely fine flakelets having a granulometry of from 0.2 to 0.5 mm.

The mass is subjected to agitation and gaseous hydrogen chloride is made to bubble through for a few minutes, until by the effect of the reaction heat due to the attack of the metallic aluminium by the hydrogen chloride, the temperature rises to 50° – 60° C. At this point the introduction of hydrogen chloride is stopped and the mass is kept agitated for 1 hour at 60° C.

The separated solid is then filtered and the said solid is washed first with benzol and then with petroleum ether. In this manner 40.5 parts by weight of aluminium trichloride and 1 part by weight of unreacted metallic aluminium are obtained.

Moreover, 68.5 parts by weight of organic product are recovered.

EXAMPLE 2

100 parts by weight of the catalytic complex used in Example 1 are loaded into the reactor together with 3 parts by weight of aluminium in granules with a mesh of from 5 to 70, and of a purity grade of 95.5% the remaining part being mainly formed of carbon. The agitated mass is fed with gaseous hydrogen chloride until it reaches 60° C and is kept at this temperature for 6 hours. After filtration, 30 weight of aluminium trichloride and 1.5 parts by weight of unaltered metallic aluminium are recovered.

Moreover, there remains a residue of 56 parts by weight of organic phase and 20 parts by weight of unaltered catalytic complex.

Therefore in this example 80% of the loaded catalytic complex is decomposed.

EXAMPLE 3

One operates as in Example 2 carrying on for 12 hours at 60° C. After this period of time 44 parts by weight of aluminium trichloride and 67.5 by weight of organic products are recovered. The aluminium trichloride comes from the catalytic complex (30 parts by weight) and from the reaction of aluminium with hydrogen chloride (14 parts by weight).

EXAMPLE 4

One places into contact aluminium trichloride and a mixture of benzene and ethyl-benzene (molar ratio 1/1) and anhydrous hydrogen chloride is made to bubble through. In this manner a catalytic complex is obtained, having a content of 5.45% by weight of $Al^{3+}$.

100 gr. of the catalytic complex thus prepared are contacted with 3 grams of finely subdivided metallic aluminium (powder of mesh 20–80) and the mass is agitated and kept at 60° for 90 minutes.

After filtering and washing the precipitated solid, one obtains 36.2 grams of aluminium trichloride and 74 grams of organic compounds.

25.4 gr. of the aluminium trichloride come from the decomposed catalytic complex and 10.8 from the attacked metallic aluminium.

The organic phase is essentially composed of benzene, ethylbenzene and di-ethylbenzene.

We claim:
1. A method for separating and recovering aluminum trichloride from a complex of aluminum trichloride, hydrocarbons and hydrogen chloride, said complex containing at least 20% by weight aluminum trichloride, which comprises contacting said complex with particulate metallic aluminum surface activated by contact with hydrogen chloride at a temperature of from ambient temperature to 100° C, for at least 0.5 hours and, optionally employing agitation, thus causing the formation of a precipitate of aluminum trichloride and by-products including gaseous hydrogen and liquid hydrocarbon, and recovering the precipitated aluminum trichloride.

2. The method of claim 1, wherein said metallic aluminum has a granulometry of from 5 to 500 mesh.

3. The method of claim 1, wherein said temperature is from 50° to 80° C.

4. The method of claim 1, wherein the amount of metallic aluminum used is of from 0.2 to 1.0 gram-atoms for every gram-molecule of aluminum trichloride present in the complex.

5. The method of claim 4, wherein said amount is of from 0.3 to 0.5 gram-molecule for every gram-molecule of aluminum trichloride present in the complex.

6. The method of claim 1, wherein said complex is contacted with metallic aluminum for a period of from 0.5 to 12 hours.

7. The method of claim 1, wherein the metallic aluminum particles are surface activated by contact with hydrogen chloride before being contacted with the complex.

8. The method of claim 1, wherein the metallic aluminum particles are surface activated by contact with hydrogen chloride during an initial contact period with the complex.

* * * * *